(12) United States Patent
Pabis et al.

(10) Patent No.: US 7,551,705 B2
(45) Date of Patent: Jun. 23, 2009

(54) FUEL ASSEMBLY TOP NOZZLE REPAIR SLEEVE AND METHOD FOR REPAIRING A FUEL ASSEMBLY

(75) Inventors: George S. Pabis, Lynchburg, VA (US); Anthony A. Pugh, Forest, VA (US); Raymond A. King, Lynchburg, VA (US); Darel R. Clark, Lynchburg, VA (US)

(73) Assignee: Areva NP, Inc., Lynchburg, VA (US)

( * ) Notice: Subject to any disclaimer, the term of this patent is extended or adjusted under 35 U.S.C. 154(b) by 0 days.

(21) Appl. No.: 10/733,213

(22) Filed: Dec. 11, 2003

(65) Prior Publication Data

US 2005/0129163 A1    Jun. 16, 2005

(51) Int. Cl.
*G21C 19/00*    (2006.01)
(52) U.S. Cl. ............... 376/261; 376/260; 376/446; 376/451
(58) Field of Classification Search ............ 376/178, 376/202–205, 251, 260, 261, 353, 437, 446, 376/451, 452; 72/370.01, 370.06, 370.08, 72/392, 483, 393, 399; 411/21, 60.1, 54.1, 411/38, 340; 403/408.1
See application file for complete search history.

(56) References Cited

U.S. PATENT DOCUMENTS

| | | | |
|---|---|---|---|
| 3,212,991 A | | 10/1965 | Brynsvold et al. |
| 3,257,118 A | * | 6/1966 | Broadhead ............... 277/621 |
| 3,572,081 A | * | 3/1971 | Alexander ............... 72/393 |
| 3,583,200 A | * | 6/1971 | Cvijanovic et al. ......... 72/393 |
| 3,599,995 A | * | 8/1971 | Rafalski et al. ........... 277/626 |
| 3,791,466 A | * | 2/1974 | Patterson et al. .......... 376/442 |
| 3,893,270 A | * | 7/1975 | Schupack et al. ......... 376/296 |
| 3,932,217 A | | 1/1976 | Cachera |
| 3,965,630 A | * | 6/1976 | Roberts ................. 52/223.13 |
| 4,146,953 A | | 4/1979 | King, Jr. |
| 4,617,171 A | * | 10/1986 | Feutrel .................. 376/446 |
| 4,631,167 A | * | 12/1986 | Brunon .................. 376/446 |
| 4,641,409 A | * | 2/1987 | Shallenberger et al. .... 29/401.1 |
| 4,653,180 A | * | 3/1987 | Le Pargneux et al. ....... 29/723 |
| 4,663,119 A | * | 5/1987 | Kerrey .................. 376/446 |
| 4,684,498 A | * | 8/1987 | Paul .................... 376/446 |
| 4,684,500 A | * | 8/1987 | Gjertsen et al. .......... 376/446 |
| 4,699,758 A | * | 10/1987 | Shallenberger et al. ..... 376/446 |
| 4,699,759 A | * | 10/1987 | Feild, Jr. ............... 376/446 |
| 4,699,760 A | * | 10/1987 | Shallenberger et al. ..... 376/446 |
| 4,717,527 A | * | 1/1988 | Gjertsen et al. .......... 376/209 |
| 4,736,613 A | * | 4/1988 | Dailey .................. 72/393 |
| 4,738,821 A | * | 4/1988 | Shallenberger et al. ..... 376/446 |
| 4,747,997 A | * | 5/1988 | Boatwright ............. 376/261 |
| 4,751,039 A | * | 6/1988 | Delevallee et al. ......... 376/261 |
| 4,761,105 A | | 8/1988 | Gardner |

(Continued)

OTHER PUBLICATIONS

Definition of the term "dimple"; p. 325, Merriam-Webster's Collegiate Dictionary, Tenth Edition Copyright 2001.*

*Primary Examiner*—Rick Palabrica
(74) *Attorney, Agent, or Firm*—Kenyon & Kenyon LLP

(57) ABSTRACT

A method and device to repair nuclear fuel assembly structural defects in the top nozzle to guide thimble connection, wherein the device includes a repair sleeve comprising tendons configured to deflect to allow establishment of a structural connection between a projection on each tendon and a dimple area of a guide thimble.

13 Claims, 3 Drawing Sheets

U.S. PATENT DOCUMENTS

| | | | |
|---|---|---|---|
| 4,779,445 A * | 10/1988 | Rabe | 72/393 |
| 4,793,382 A * | 12/1988 | Szalvay | 138/98 |
| 4,834,934 A * | 5/1989 | Salton et al. | 376/271 |
| 4,878,790 A | 11/1989 | McSherry et al. | |
| 4,902,468 A * | 2/1990 | Veronesi et al. | 376/327 |
| 4,960,650 A * | 10/1990 | Vigneron et al. | 428/594 |
| 5,052,870 A | 10/1991 | Pratt et al. | |
| 5,056,973 A | 10/1991 | Pratt et al. | |
| 5,147,599 A * | 9/1992 | Mansson | 376/446 |
| 5,274,684 A * | 12/1993 | Yoshida et al. | 376/261 |
| 5,357,547 A * | 10/1994 | Obermeyer et al. | 376/254 |
| 5,367,548 A * | 11/1994 | Attix | 376/446 |
| 5,465,282 A * | 11/1995 | Berglund | 376/426 |
| 5,608,768 A | 3/1997 | Matzner et al. | |
| 5,730,540 A | 3/1998 | Duran et al. | |
| 5,752,311 A * | 5/1998 | Snyder | 29/723 |
| 5,791,046 A * | 8/1998 | Schafer | 29/890.031 |
| 5,803,686 A * | 9/1998 | Erbes et al. | 411/55 |
| 5,844,958 A * | 12/1998 | Leroux et al. | 376/446 |
| 5,845,945 A * | 12/1998 | Carstensen | 285/321 |
| 5,983,487 A * | 11/1999 | Snow et al. | 29/727 |
| 6,016,678 A * | 1/2000 | Diller | 72/119 |
| 6,036,418 A | 3/2000 | Stencel et al. | |
| 6,356,614 B1 * | 3/2002 | Allen et al. | 376/437 |
| 6,435,566 B1 * | 8/2002 | Topf, Jr. | 285/236 |
| 6,442,227 B1 * | 8/2002 | Iacovino et al. | 376/272 |
| 6,636,578 B1 * | 10/2003 | Clark | 376/261 |
| 6,712,556 B2 * | 3/2004 | Penza | 405/183.5 |
| 6,732,425 B2 * | 5/2004 | Schafer | 29/727 |

* cited by examiner

FUEL ASSEMBLY TOP NOZZLE REPAIR SLEEVE AND METHOD FOR REPAIRING A FUEL ASSEMBLY

FIELD OF THE INVENTION

The present invention relates to handling of fuel assemblies for nuclear reactors. More specifically, the present invention relates to a method and device for installing a top nozzle repair sleeve in a nuclear fuel assembly to assist in structural transfer of forces when the fuel assembly is lifted.

BACKGROUND INFORMATION

Present-day nuclear power reactors use fuel in the form of fuel assemblies. The fuel assemblies usually are comprised of a uranium dioxide matrix, generally in the shape of pellets, stacked end-to-end. The stacked pellets are clad on their respective exterior by a zirconium metal alloy which prevents direct contact between the uranium dioxide pellets and reactor coolant. The fuel rods formed by the pellets cladded by the zirconium metal alloy are placed in a structural skeleton in a side by side arrangement to allow a dense packing of nuclear material. At the top and bottom of the fuel assembly, respective top and bottom nozzles are positioned to allow coolant to be channeled through the fuel assembly to remove heat generated by the nuclear fuel.

Industry experience has discovered that fuel assemblies can degrade over time near the top nozzle section of the fuel assembly. The top nozzle is connected to an interior shaft, (i.e. a guide thimble), to establish a structural connection between the top nozzle and a remainder of the fuel assembly. Industry experience has identified that a connection established between the top nozzle and the guide thimble, often in the form of a guide thimble sleeve, can be prone to stress corrosion cracking through continued fuel assembly use. When the nuclear reactor is refueled and depleted fuel assemblies removed from or repositioned in the reactor core, each fuel assembly is lifted and/or removed from the reactor using a fuel handling or polar crane. Degradation of the structural support established between the top nozzle and the guide thimbles prevents movement of the degraded fuel assembly as the fuel assembly may not be structurally adequate to lift its own weight. During inspections of the fuel assembly prior to lifting, if it is determined that the fuel assembly exhibits stress corrosion cracking or some other defect in the guide thimble structural load path, either the fuel assembly is moved in a piece-wise fashion, a special lifting device is fabricated to lift the assembly, or an extensive and lengthy structural repair is performed to allow the fuel assembly to be lifted. Current repair alternatives to correct stress corrosion cracking often delay nuclear reactor restart, thereby increasing the economic costs for the reactor owner.

There is a need to provide a method and device to repair damaged fuel assemblies such that a damaged fuel assembly may be lifted in a safe condition.

There is a further need to provide a method and device to provide a permanent repair for fuel assemblies which have stress corrosion cracking in areas such as the top nozzle, the guide thimble sleeves and the guide thimble.

There is a further need to provide an economically efficient method and device for repair of degraded fuel assemblies such that the repair may be accomplished quickly and efficiently. There is a still further need to provide a device and method to repair damaged fuel assemblies that are radioactive.

There is a still further need to provide a device and method to repair damaged fuel assemblies that are radioactive.

SUMMARY

It is an objective of the present invention to provide a method and device to repair damaged nuclear fuel assemblies such that a damaged fuel assembly may be lifted safely.

It is also an objective of the present invention to provide a method and device to provide a permanent repair for fuel assemblies which exhibit structural defects, such as stress corrosion cracking, between the top nozzle, the guide thimble sleeves and the guide thimble.

It is furthermore an objective of the present invention to provide an economically efficient method and device for repair of degraded fuel assemblies such that the repair may be accomplished quickly and efficiently.

It is also an objective of the present invention to provide a device and method to repair damaged fuel assemblies that are radioactive.

These and other objectives of the present invention will be achieved as illustrated and described. The present invention provides a repair sleeve for a nuclear fuel assembly. The present invention provides a shaft with a first end, a second end and a diameter, the diameter configured to fit into a guide thimble opening of a top nozzle of the nuclear fuel assembly, wherein the diameter of the shaft is dimensioned such that an exterior of the shaft snugly fits into the guide thimble opening, wherein the shaft has at least two openings. The present invention also provides for at least two tendons extending through the openings, wherein the tendons are configured to deflect in an instance of a horizontal load on the tendon, the tendons having a dimple configured to be inserted into a dimple of a guide thimble sleeve, wherein the shaft is configured to internally accept a control component of the fuel assembly and wherein at least two tendons do not deflect under a load when a thimble insert assembly is installed.

The invention furthermore provides a method to repair a fuel assembly. The method comprises providing a repair sleeve, the repair sleeve having a shaft with a first end, a second end and a diameter, the diameter configured to fit into a guide thimble opening of a top nozzle of the fuel assembly. The method also provides that the diameter of the shaft is dimensioned such that an exterior of the shaft snugly fits into the guide thimble opening, wherein the shaft has at least two openings. The method also provides that at least two tendons extend through the openings, the tendons configured to deflect in an instance of a load on the tendon, the tendons having a dimple configured to be inserted into a dimple of a guide thimble sleeve. The method furthermore provides for inserting the repair sleeve in the guide thimble opening in the top nozzle of the nuclear fuel assembly such that the dimples of the tendons project into the dimples of the guide thimble sleeve, and inserting a control component into an interior of the repair sleeve.

DETAILED DESCRIPTION

Figure 1:
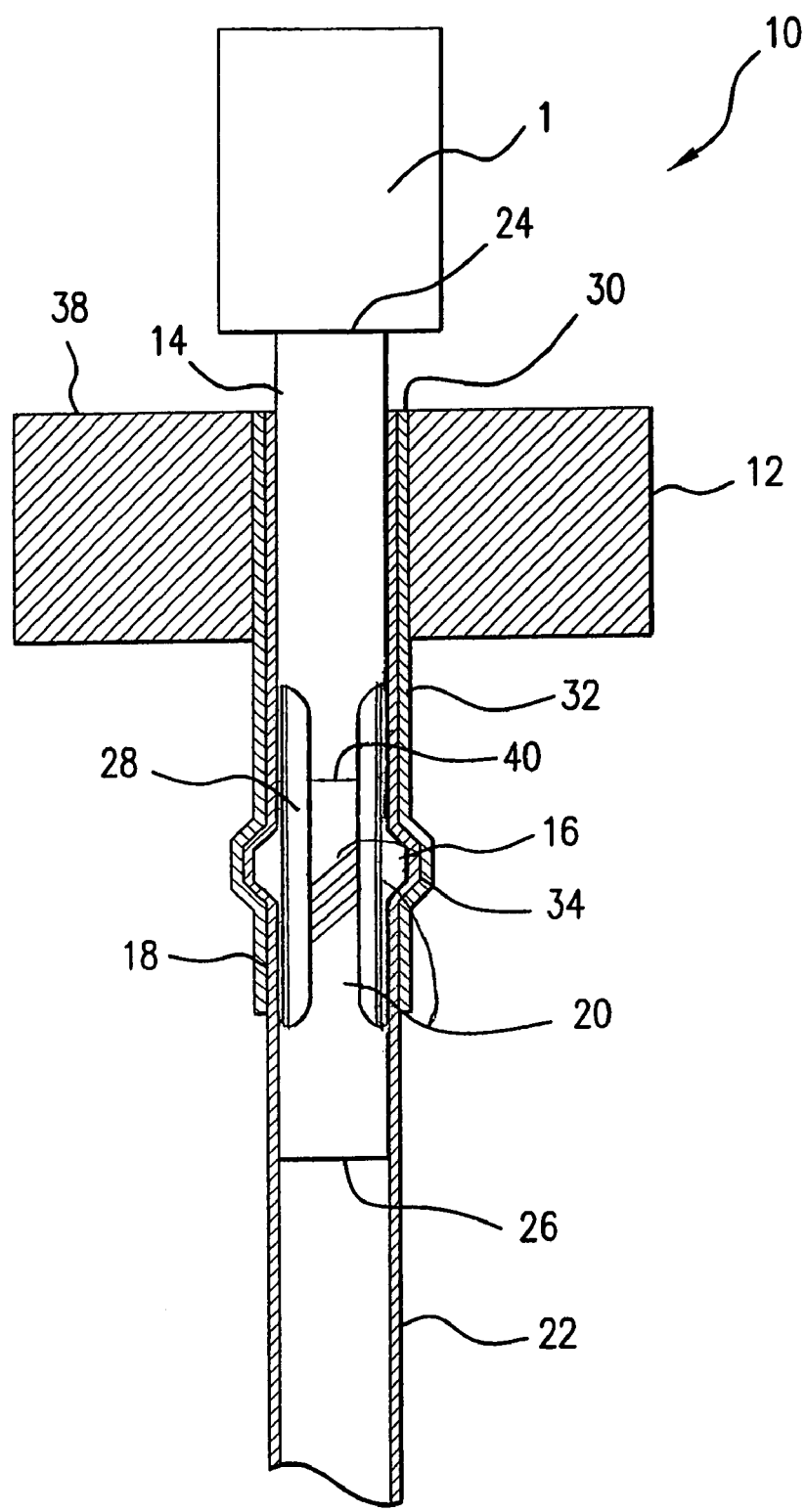
FIG. 1 is a side cross sectional view of a repair sleeve in conformance with the present invention.

Referring to FIG. 1, a repair sleeve 10 is illustrated which is used to aid in structural load transfer in a fuel assembly. Structural defects arising from stress corrosion cracking, for example, limit the capability of operators to move fuel assemblies as these structural defects may negatively impact safe lifting of the fuel assembly. Structural defects are often found in a swaged area 18 which connects the top nozzle 12 to the guide thimble 22.

The repair sleeve 10 has a shaft 14 which is configured to allow a structural load transfer of force from the body of the fuel assembly through the top nozzle 12 of the fuel assembly. The repair sleeve 10 is configured with a first end 24 and a second end 26. The second end 26 is configured to be inserted into a nozzle opening 30 in the top nozzle 12 of the fuel assembly. The first end 24 may protrude from a top surface 38 of the top nozzle to allow for connection of lifting components as required. The first end 24 may be configured such that an installer may easily differentiate the first end 24 from the second end 26. Differentiation may be through geometric variation, such as an end which flairs outwardly, through the incorporation of a hole, or marking the exterior of the first end 24. Other configurations are possible and as such, the configuration presented in FIG. 1 is but one exemplary embodiment.

The shaft 14 of the repair sleeve 10 may be made of stainless steel, for example, to allow for rigidity during a fuel assembly lift. Other materials, such as Inconel, stainless steel, and zirconium alloys, may also be used as well as materials which will eliminate or lessen potential galvanic reaction between fuel assembly structural materials and the repair sleeve 10. The material chosen for the repair sleeve 10 shall not exhibit permanent plastic deformation of the material upon insertion of the repair sleeve 10 into the top nozzle 12, associated guide thimble sleeve 32 and guide thimble 22.

The shaft 14 may be configured with a plurality of sleeve openings 28. The number of sleeve openings 28 may be varied for the shaft 14. Tendons 20 may be positioned through the sleeve openings 28. The tendon width 40 may be varied such that the overall physical dimensions of the tendons 20 may be altered. The tendons 20 may be configured with a dimple 16 which corresponds to openings in a dimple area 34 in the guide thimble sleeve 32. The embodiment provided in FIG. 1 illustrates a connection between a first dimple area 34 and the projection 16 of the tendon 20. The repair sleeve 10, however, may have an overall length chosen such that the projection 16 of the tendons 20 extend to a second or third dimple area further inside the fuel assembly guide thimble. The diameter of the sleeve 10, except for the projection 16, may be a constant value.

The length of the projection 16 which projects into the dimple area 34 may be configured to closely fit into the overall shape defined by the dimple area 34. The projections 16 may be configured in a trapezoidal shape, a hemispherical shape or other appropriate geometry. The number of dimples 16 in contact with dimple areas 34 may also be varied such that more or less structural support is established. The number of projections 16 per tendon 20 may also be varied. Tendon length may be chosen such that the tendon 20 may extend to and between multiple dimple areas, providing additional structural support connection.

Figure 2:
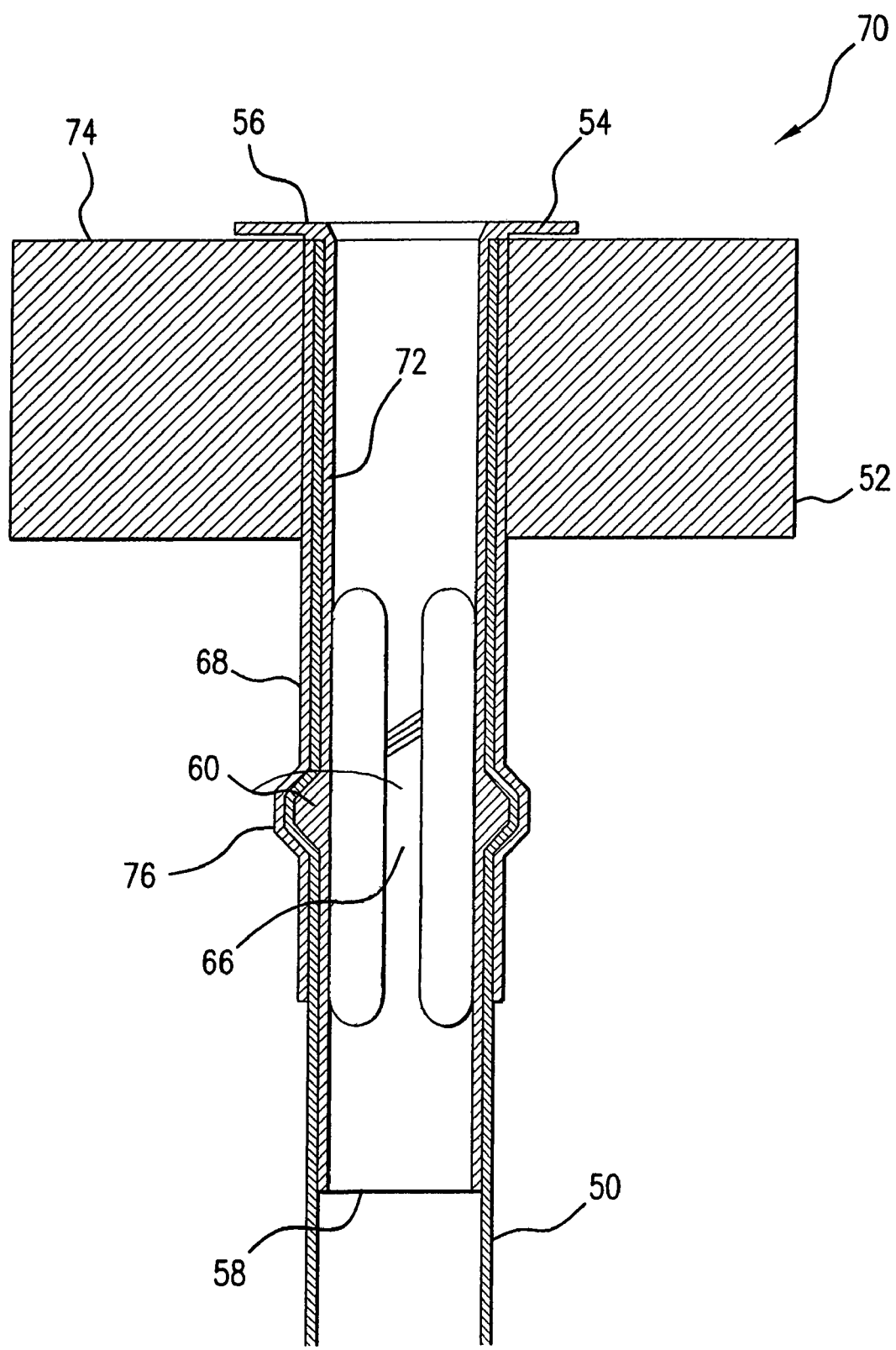
FIG. 2 is a side cross sectional view of a second embodiment of a repair sleeve.

Referring to FIG. 2, a second embodiment of a repair sleeve 70 is illustrated. The repair sleeve 70 has a shaft 72. The repair sleeve 70 has a first end 56 and a second end 58. The second end 58 is configured to be inserted into a guide thimble opening of the top nozzle 52. The first end 56 of the repair sleeve 70 may be configured with a lapped edge 54 which extends beyond an external top surface 74 of the top nozzle 52. The lapped edge 54 may have an external diameter which is greater in circumference than the external diameter of the opening of the top nozzle 52 for the guide thimble 50. Although illustrated as a circular lapped edge 54, other configurations are possible, such as square, hexagonal, or octagonal for example. The lapped edge 54 may be finally configured while the repair sleeve 70 is installed in the top nozzle 52. Alternatively, the lapped edge 54 may be preformed prior to installation of the repair sleeve 70.

A projection 60 may be formed on a tendon 66 of the repair sleeve 70. The length of the tendon 66 may be chosen such that the projection 60 is placed in a dimple area 76 formed from the swaged area 78 of the guide thimble 50 and the guide thimble sleeve 68. The contact established between the projection 60 and the dimple area 76 may be configured to allow a transfer of a specified amount of force. Similar to the first embodiment, the repair sleeve 70 may be modified such that the overall length of the sleeve 70 may reach multiple dimple areas in the guide thimble 50. The projection 60 may be formed in any geometric configuration such as a hemispherical, trapezoidal or other arrangement.

Figure 3:
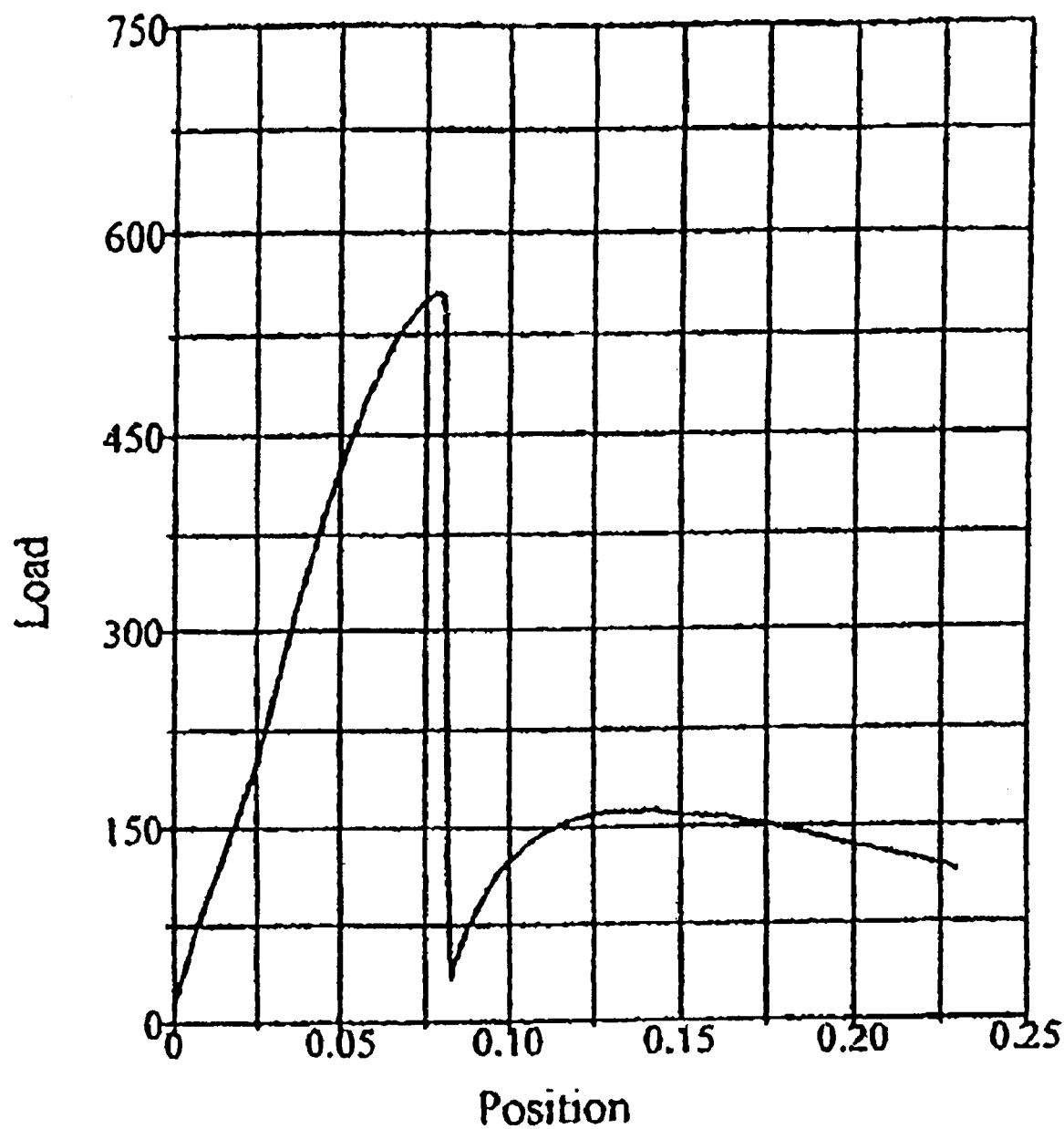
FIG. 3 is a graph illustrating structural load carrying capacity of the repair sleeve.

Referring to FIG. 3, a graph of the structural capacity of the repair sleeve 10 is illustrated. The vertical axis of the graph represents load carrying capacity of the repair sleeve 10. The horizontal axis of the graph represents overall position of the repair sleeve. As illustrated, the repair sleeve provides for an increase in load with a corresponding increase in displacement. Load carrying capacity then decreases after a maximum load carrying capacity is reached. Load carrying capacity is related to the amount of penetration of the projections into the dimple area. Greater penetration of the projections into the dimple area allows greater load carrying capacity.

The present invention provides a structural support that engages existing features of fuel assemblies to secure the upper or top nozzle of the fuel assembly to internal guide thimbles. Multiple repair sleeves may be used to transfer only a partial load of the fuel assembly if required.

This connection is used during lifting of the fuel assembly to allow the individual fuel rods to be lifted in unison with a desired factor of safety. The shaft 14 is split into separate sections (the tendons 20) by the sleeve openings 28 in the shaft material in the location of the dimple area 34 to deflect into the dimple area (34).

Operationally, a repair sleeve 10 is provided. The repair sleeve 10 is inserted into a guide thimble opening in the top nozzle 12 of the nuclear fuel assembly such that the projections 16 of the tendons 20 project into the dimple area 34 of the guide thimble sleeve. The insertion may be performed through a robotic device, or remote delivery tooling to install the sleeve in an irradiated environment or through use of a crane. The tooling can be configured to deliver singular or multiple sleeves at a time and install the sleeves to the engaged position. The insertion of the sleeve 10 in the top nozzle 12 causes the tendons 20 of the sleeve 10 to flex inward toward a centerline of the sleeve 10. The sleeve insertion is then continued until the dimples 16 of the sleeve 10 intersect a dimple area 34 of the swaged area 18. The tendons 20 of the sleeve 10 then extend away from a centerline of the sleeve 10 to allow the projections 16 to project into the dimple area 34. A thimble insert assembly 1 (control component, BPRA, WABA, plug) of the fuel assembly is then inserted into an interior of the repair sleeve 10. The installation of the thimble insert assembly into the repair sleeve 10 prevents the dimples 16 from exiting the dimple area 34 through plastic deformation of the sleeve 10. A structural connection is thereby established between the projections 16 and the dimple area 34. The first end 24 may be configured to extend from the top nozzle 12 or may be manipulated such that a desired geometric configuration is established.

The repair sleeve 10 may be removed from the guide thimble 22 by removing the control component from the interior of the repair sleeve 10. The first end 14 of the repair sleeve 10 may then be pulled such that the tendons 20 of the sleeve 10 deflect allowing the dimple 16 to be removed from the dimple area 34.

The present invention provides several advantages to other methods and devices for lifting fuel assemblies. The installation of the repair sleeve can be accomplished in a quick and efficient manner limiting economic expense. Moreover, the repair sleeve can be installed from a remote location, thereby limiting radiation exposure for workers installing the sleeves. The installation of the repair sleeve is performed with tools that are not complex, thereby allowing ordinary skilled craftspeople to install the sleeves with minimal special training. The present invention has a minimum of moving parts, thereby limiting potential failure over the life of the repair sleeve. The present invention also uses materials which are known to be successful in harsh environments, thereby limiting further degradation of the fuel assembly over time or affecting nuclear components in the facility. The present invention furthermore can be adapted to achieve different configurations to allow for differing attachment configurations and structural capacities. The present invention furthermore provides a configuration that will allow inspection of the sleeve through visual examination in an installed condition. The repair sleeve will not negatively affect overall fuel assembly pressure drop due to its relatively small size. The repair sleeve small size additionally limits the ultimate amount of disposed radiation waste for the fuel assembly. Additional sleeves 10 may be installed in a fuel assembly to provide further support.

In the foregoing specification, the invention has been described with reference to specific exemplary embodiments, thereof. It will, however, be evident that various modifications and changes may be made thereunto without departing from the broader spirit and scope of the invention as set forth in the claims. The specification and drawings are accordingly to be regarded in an illustrative rather than a restrictive sense.

What is claimed is:

1. A method for repairing a nuclear fuel assembly, comprising:

first providing a repair sleeve, the repair sleeve having a shaft with a first end, a second end, and a diameter, the diameter configured to fit into a guide thimble in a guide thimble opening of a top nozzle of the fuel assembly, the guide thimble connected to the top nozzle, wherein the diameter of the shaft is dimensioned such that an exterior of the shaft fits into the guide thimble in the guide thimble opening, wherein the shaft has at least two openings, each opening having a first closed end, oriented towards the shaft first end, and a second closed end, oriented towards the shaft second end, and a tendon connecting the first closed end and the second closed end of each opening, such that the tendon bridges the first and second closed ends of each opening, dividing each opening into two portions, the tendons configured to deflect in an instance of a horizontal load on the tendon during insertion, each of the tendons having at least one projection configured to be inserted into a dimple of a guide thimble sleeve, and the repair sleeve having a lapped edge for installation on the top of the top nozzle of the nuclear fuel assembly; and then inserting the second end of the shaft of the provided repair sleeve into the guide thimble in the guide thimble opening in the top nozzle of the nuclear fuel assembly, the guide thimble connected to the top nozzle, such that the second ends of the tendons, the projections of the tendons, and the second ends of the openings are inserted into the guide thimble before the first ends of the tendons and the first ends of the openings are inserted into the guide thimble, and the projections of the tendons project into the dimples of the guide thimble sleeve; and inserting a thimble insert assembly into an interior of the provided repair sleeve.

2. The method according to claim 1, wherein the step of inserting the thimble insert assembly into the interior of the repair sleeve prevents further deflection of the repair sleeve in a horizontal direction.

3. The method according to claim 1, wherein the shaft has two openings and two tendons extending through the openings, each of the tendons having one projection.

4. The method according to claim 2, wherein the shaft has two openings and two tendons extending through the openings, each of the tendons having one projection.

5. The method according to claim 1, wherein the at least one projection is configured in a trapezoidal shape or a hemispherical shape.

6. The method according to claim 5, wherein the at least one projection is configured in a trapezoidal shape.

7. The method according to claim 5, wherein the at least one projection is configured in a hemispherical shape.

8. The method according to claim 2, wherein the at least one projection is configured in a trapezoidal shape or a hemispherical shape.

9. The method according to claim 8, wherein the at least one projection is configured in a trapezoidal shape.

10. The method according to claim 8, wherein the at least one projection is configured in a hemispherical shape.

11. The method according to claim 3, wherein the projection is configured in a trapezoidal shape or a hemispherical shape.

12. The method according to claim 11, wherein the at least one projection is configured in a trapezoidal shape.

13. The method according to claim 11, wherein the at least one projection is configured in a hemispherical shape.

* * * * *